(12) United States Patent
Ahmed et al.

(10) Patent No.: US 10,940,439 B1
(45) Date of Patent: Mar. 9, 2021

(54) HIGH WATER RECOVERY HYBRID MEMBRANE SYSTEM FOR DESALINATION AND BRINE CONCENTRATION

(71) Applicant: KUWAIT INSTITUTE FOR SCIENTIFIC RESEARCH, Safat (KW)

(72) Inventors: Mansour Ahmed, Safat (KW); Rajesha Kumar, Safat (KW); Garudachari Bhadrachari, Safat (KW); Yousef Jassim Essa Al-Wazzan, Safat (KW); Jibu Pallickel Thomas, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 16/709,812

(22) Filed: Dec. 10, 2019

(51) Int. Cl.
*B01D 61/58* (2006.01)
*C02F 9/00* (2006.01)
(Continued)

(52) U.S. Cl.
CPC ........... *B01D 61/58* (2013.01); *B01D 61/002* (2013.01); *B01D 61/022* (2013.01);
(Continued)

(58) Field of Classification Search
CPC ... B01D 11/00; B01D 11/04; B01D 2011/002; B01D 2011/005; B01D 37/00; B01D 61/00; B01D 61/002; B01D 61/005; B01D 61/02; B01D 61/022; B01D 61/025; B01D 61/027; B01D 61/04; B01D 61/08; B01D 61/58; B01D 63/00; B01D 63/08; B01D 2311/02; B01D 2311/04; B01D 2311/06;
(Continued)

(56) References Cited

U.S. PATENT DOCUMENTS 9,604,178 B1    3/2017    Bharwada et al.
10,308,524 B1    6/2019    Ahmed et al.
(Continued)

OTHER PUBLICATIONS

Jamil, "Forward Osmosis in Reverse Osmosis Concentrate," PhD. Thesis, University of Technology Sydney, Jul. 2017.

*Primary Examiner* — Clare M Perrin
(74) *Attorney, Agent, or Firm* — Nath, Goldberg & Meyer; Richard C. Litman (57) ABSTRACT

The high water recovery hybrid membrane system for desalination and brine concentration combines nanofiltration, reverse osmosis and forward osmosis to produce pure water from seawater. The reject side of a nanofiltration unit receives a stream of seawater and outputs a brine stream. A permeate side of the nanofiltration unit outputs a permeate stream. A feed side of a reverse osmosis desalination unit receives a first portion of the permeate stream and outputs a reject stream. A permeate side of the reverse osmosis desalination unit outputs pure water. A draw side of at least one forward osmosis desalination unit receives the reject stream and outputs concentrated saline solution. A feed side of the at least one forward osmosis desalination unit receives a second portion of the permeate stream and outputs a dilute saline stream, which mixes with the first portion of the permeate stream fed to the reverse osmosis desalination unit.

2 Claims, 4 Drawing Sheets

(51) Int. Cl.
  *B01D 61/00* (2006.01)
  *B01D 61/02* (2006.01)
  *C02F 1/44* (2006.01)
  *C02F 103/08* (2006.01)

(52) U.S. Cl.
  CPC ......... *B01D 61/025* (2013.01); *B01D 61/027* (2013.01); *C02F 9/00* (2013.01); *B01D 2317/022* (2013.01); *B01D 2317/025* (2013.01); *C02F 1/441* (2013.01); *C02F 1/442* (2013.01); *C02F 1/445* (2013.01); *C02F 2103/08* (2013.01); *C02F 2301/08* (2013.01)

(58) Field of Classification Search
  CPC ........ B01D 2311/08; B01D 2311/2649; B01D 2315/00; B01D 2317/00; B01D 2317/02; B01D 2317/022; B01D 2317/025; B01D 2317/08; C02F 1/441; C02F 1/442; C02F 1/444; C02F 1/445; C02F 9/00; C02F 2103/08; C02F 2201/00; C02F 2201/007
  USPC ....... 210/797, 790, 805, 252, 259, 294, 295, 210/321.6, 321.72, 321.75, 321.84, 322, 210/323, 348, 500.1, 500.21
  See application file for complete search history.

(56) References Cited

U.S. PATENT DOCUMENTS

| | | | |
|---|---|---|---|
| 2006/0144789 A1* | 7/2006 | Cath | B01D 61/58 |
| | | | 210/641 |
| 2015/0114905 A1* | 4/2015 | Subbiah | B01D 65/10 |
| | | | 210/636 |
| 2015/0352497 A1* | 12/2015 | Sakai | C02F 1/441 |
| | | | 210/252 |
| 2016/0002073 A1 | 1/2016 | Nowosielski-Slepowron | |
| 2018/0155218 A1 | 6/2018 | Hancock et al. | |
| 2019/0185350 A1 | 6/2019 | Drover et al. | |
| 2019/0225521 A1 | 7/2019 | Heath | |

* cited by examiner

HIGH WATER RECOVERY HYBRID MEMBRANE SYSTEM FOR DESALINATION AND BRINE CONCENTRATION

BACKGROUND

1. Field

The disclosure of the present patent application relates to desalination systems, and particularly to a high water recovery hybrid membrane system for desalination and brine concentration for desalinating water that combines nanofiltration (NF), reverse osmosis (RO), and forward osmosis (FO) techniques.

2. Description of the Related Art

Nanofiltration (NF) is a relatively recent membrane filtration process used most often with low total dissolved solids water, such as surface water and fresh groundwater, with the purpose of softening (i.e., polyvalent cation removal) and removal of disinfection by-product precursors, such as natural organic matter and synthetic organic matter. Nanofiltration is a membrane filtration-based method that uses nanometer-size pores that pass through the membrane. Nanofiltration membranes have pore sizes from 1-10 nm, which are smaller than those used in microfiltration and ultrafiltration, but just larger than the pores in membranes used for reverse osmosis. The most commonly used NF membranes are in the form of polymer thin films, such as polyethylene terephthalate.

One of the main advantages of nanofiltration as a method of softening water is that during the process of retaining calcium and magnesium ions (while passing smaller hydrated monovalent ions), filtration is performed without adding extra sodium ions (as used in ion exchangers). Nanofiltration can also be operated at room temperatures, and also has the very favorable benefit of being able to process large volumes, as well as being able to continuously produce streams of products. However, nanofiltration on its own is the least used method of membrane filtration due to the membrane pore sizes being limited to only a few nanometers. For filtration of anything smaller, reverse osmosis is used, and for filtration of anything larger, ultrafiltration is typically used. It may, however, be desirable to combine the benefits of nanofiltration with other forms of filtration, such as reverse osmosis (RO) and forward osmosis (FO) processes.

Reverse osmosis (RO) is a common filtration technique used in water purification systems. These systems typically include a semipermeable membrane with a pore size up to 1 nm to remove ions, molecules, and larger particles from water. In reverse osmosis, an applied pressure is used to overcome osmotic pressure, a colligative property that is driven by chemical potential differences of the solvent. Reverse osmosis can remove many types of dissolved and suspended species from water, including bacteria, and is used in both industrial processes and the production of potable water. The result is that the solute is retained on the pressurized side of the membrane and the pure solvent is allowed to pass to the other side. The semipermeable membrane is considered to be "selective", i.e., the membrane does not allow large molecules or ions through its pores, but does allow smaller components of the solution (such as solvent molecules) to pass freely.

Figure 2:
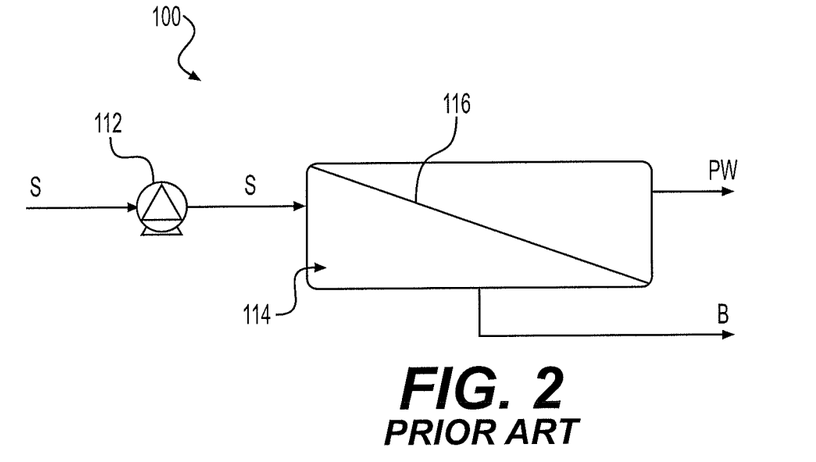
FIG. 2 is a schematic diagram of a conventional prior art reverse osmosis desalination unit.

In reverse osmosis, the efficiency of the process is dependent on pressure, flow rate, and other conditions. Reverse osmosis is most commonly known for its use in purification of seawater, e.g., for removing salt and other effluent materials from the water. FIG. 2 is a diagram of a basic prior art reverse osmosis desalination unit 100, where seawater S is fed into unit 100 for production of purified water PW. As shown in FIG. 2, a high pressure pump 112 is used to force water across the semi-permeable reverse osmosis membrane 116 from the concentrated side 114 of the reverse osmosis desalination unit 100. An efficient RO process can leave almost all (around 95% to 99%) of dissolved salts behind in the reject stream, viz., an output of concentrated brine B. The amount of pressure applied by pump 112 depends on the salt concentration of the feed water. The more concentrated the feed water, the more pressure is required to overcome the osmotic pressure. The desalinated water that is demineralized or deionized (i.e., purified water PW) is typically referred to as the "permeate" or the "pure water".

In forward osmosis (FO), water flows through a semi-permeable membrane of pore size comparable to reverse osmosis from an area of low solute concentration to an area of high solute concentration based on the osmotic pressure difference. A "draw" solution or solution of high concentration relative to that of the feed solution is used to induce a net flow of water through the membrane into the draw solution, thus effectively separating the feed water from its solutes. In contrast, the reverse osmosis process described above uses hydraulic pressure as the driving force for separation, which serves to counteract the osmotic pressure gradient. Thus, significantly more energy is required for reverse osmosis compared to forward osmosis.

Figure 3:
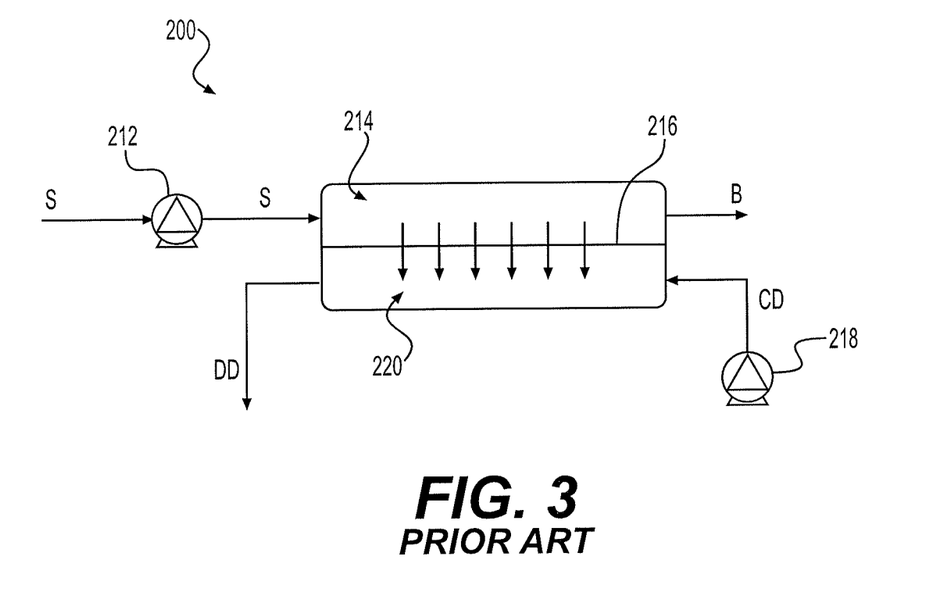
FIG. 3 is a schematic diagram of a conventional prior art forward osmosis desalination unit.

FIG. 3 is a diagram of a basic prior art forward osmosis unit 200, where the feed solution (i.e., seawater S) is fed into the feed side of unit 200 under pressure applied by pump 212. The feed solution passing through the feed side 214 separates such that pure water passes through the semi-permeable membrane 216, resulting in rejected concentrated brine B exiting unit 200. A concentrated draw solution CD fed into the draw side 220 of the unit 200 under pressure applied by pump 218 draws in pure water from the feed side 214 due to the osmotic pressure gradient between the feed side and the draw side. Diluted draw solution DD, which has been diluted by the pure water flowing through the semi-permeable membrane 216, is then drawn from the draw side 220 of unit 200. In the reverse osmosis process illustrated in FIG. 2, the permeate water PW is purified and ready for use. However, in the forward osmosis process illustrated in FIG. 3, the membrane separation of the forward osmosis process results in a "trade" between the solutes of the feed solution S and the draw solution CD.

Generally, the operating pressures necessary for reverse osmosis are very high. The requirement of such high pressure for desired efficiency levels is costly, both in terms of power consumption and maintenance. With regard to the latter, high pressure operation causes rapid fouling and scaling in the membrane, requiring frequent replacement and/or maintenance. Additionally, all materials of the system must be rated for high pressure operation, often requiring the use of expensive materials, such as stainless steel. As noted above, it may be desirable to combine the benefits of nanofiltration with other forms of filtration, such as reverse osmosis. However, due to the limitations of RO on its own, it would be further desirable to be able to make use of reverse osmosis, assisted by forward osmosis, in the combination.

Thus, a hybrid desalination system solving the aforementioned problems is desired.

SUMMARY

The high water recovery hybrid membrane system for desalination and brine concentration combines nanofiltration (NF), reverse osmosis (RO), and forward osmosis (FO) to produce pure water from seawater or other sources of saline solution or salt-contaminated water. The feed side of the nanofiltration unit receives a stream of pretreated seawater and outputs a stream of reject brine. A permeate side of the nanofiltration unit outputs a permeate stream. A feed side of a reverse osmosis desalination unit receives a first portion of the permeate stream output from the permeate side of the nanofiltration unit and outputs a reject stream. A permeate side of the reverse osmosis desalination unit outputs the pure water product. In the following, it should be understood that the initial feed stream may include seawater, brine, brackish water, produced water, wastewater, or any other type of saline stream(s).

A draw side of at least one forward osmosis desalination unit receives the reject stream output from the reverse osmosis desalination unit and outputs a concentrated saline solution. A feed side of the at least one forward osmosis desalination unit receives a second portion of the permeate stream output from the permeate side of the nanofiltration unit and outputs a dilute saline stream. The dilute saline stream is recirculated to mix with the first portion of the permeate stream output from the permeate side of the nanofiltration unit, prior to the receipt thereof by the feed side of the reverse osmosis desalination unit.

The fluid pressure within the draw side of the at least one forward osmosis desalination unit is greater than the fluid pressure within the feed side of the at least one forward osmosis desalination unit. The at least one forward osmosis desalination unit may be a single forward osmosis desalination unit or may be a plurality of forward osmosis desalination units serially connected to one another.

In an alternative embodiment, the nanofiltration unit is removed from the high water recovery hybrid membrane system for desalination and brine concentration, and the seawater is desalinated, or the brine is concentrated, using only a reverse osmosis desalination unit and a forward osmosis desalination unit. In this embodiment, the feed side of the reverse osmosis desalination unit is in fluid communication with the feed side of the forward osmosis desalination unit, such that seawater or brine drawn through the feed side of the forward osmosis desalination unit is fed into the feed side of the reverse osmosis desalination unit. A delivery pump may inject the seawater or brine, under pressure, through the feed side of the forward osmosis desalination unit, and then a circulation pump delivers the seawater or brine from the feed side of the forward osmosis desalination unit to the feed side of the reverse osmosis desalination unit. The circulation pump is a high pressure pump, such that the seawater or brine injected into the feed side of the reverse osmosis desalination unit is injected at a pressure greater than 60 bar.

The reverse osmosis desalination unit performs reverse osmosis desalination on the seawater or brine fed into the feed side, outputting product water extracted from the seawater or brinefrom the permeate side. The feed side of the reverse osmosis desalination unit outputs a reject stream. The draw side of the forward osmosis desalination unit is in fluid communication with the feed side of the reverse osmosis desalination unit, such that the draw side of the forward osmosis desalination unit receives the reject stream and outputs concentrated brine or highly saturated brine. The at least one forward osmosis desalination unit may be a single forward osmosis desalination unit or may be a plurality of forward osmosis desalination units serially connected to one another.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
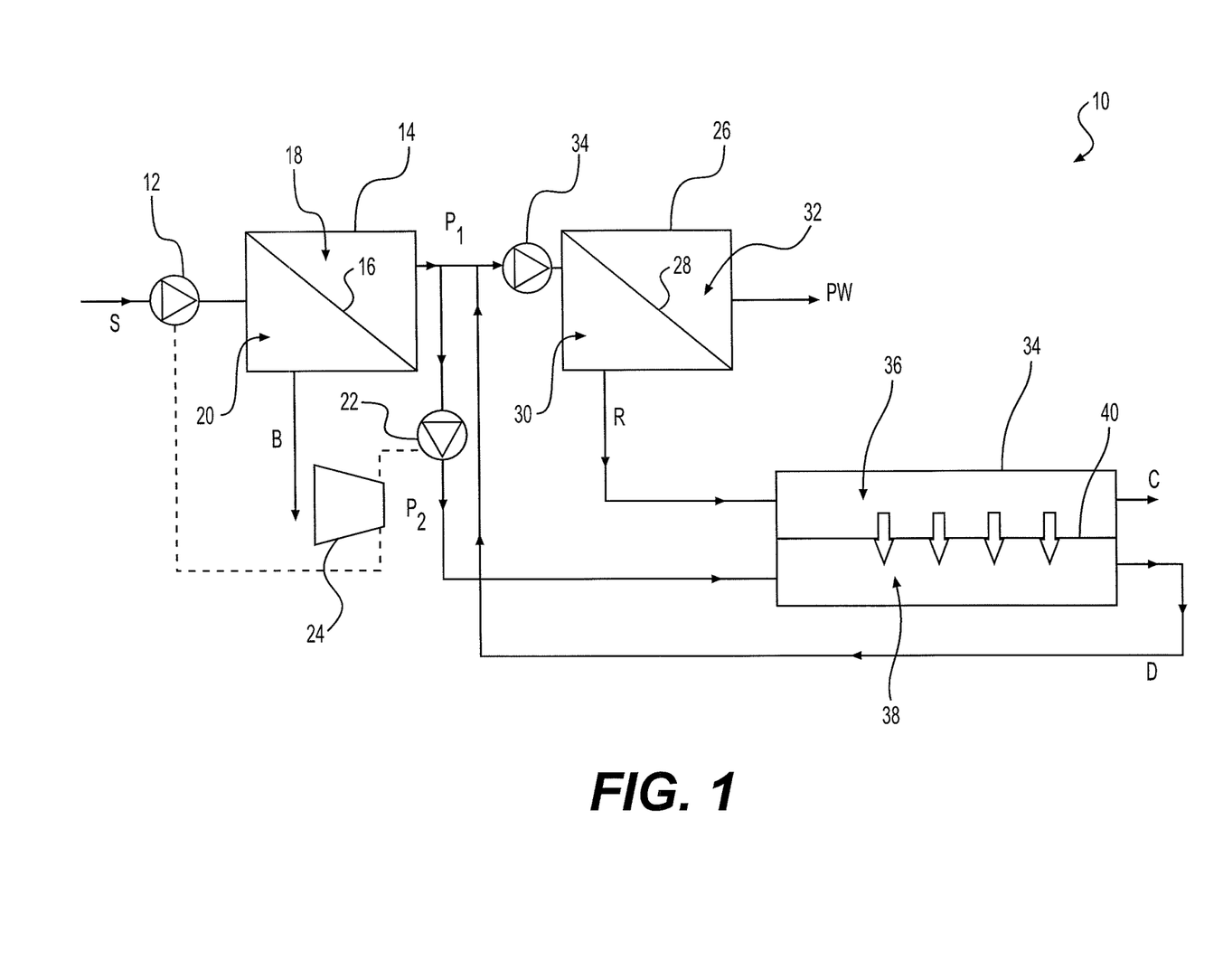
FIG. 1 is a schematic diagram of a high water recovery hybrid membrane system for desalination and brine concentration.

Referring to FIG. 1, the high water recovery hybrid membrane system for desalination and brine concentration 10 combines nanofiltration (NF), reverse osmosis (RO) and forward osmosis (FO) to produce pure water from seawater or other sources of saline solution or salt-contaminated water. As shown in FIG. 1, the feed side 20 of a nanofiltration unit 14 receives a stream of pretreated seawater S and outputs a reject brine stream B. It should be understood that the nanofiltration unit 14 may be any suitable type of nanofiltration system using a suitable nanofiltration membrane 16, such as that described above. A permeate side 18 of the nanofiltration unit 14 outputs a permeate stream. As discussed above, NF unit 14 rejects the divalent "hardness" ions from the seawater S, such as magnesium, calcium and bicarbonate ions. Thus, scaling and fouling of the RO and FO membranes 28, 40, respectively, will be reduced. It should be understood that the initial feed stream may include seawater, brine, brackish water, produced water, wastewater, or any other type of saline stream(s).

A feed side 30 of a reverse osmosis desalination unit 26 receives a first portion of the permeate stream $P_1$ output from the permeate side 18 of the nanofiltration unit 14 and outputs a reject stream R. A permeate side 32 of the reverse osmosis desalination unit 26 outputs the pure water product PW. It should be understood that reverse osmosis desalination unit 26 may be any suitable type of reverse osmosis desalination system using any suitable type of RO membrane 28, such as reverse osmosis unit 100 of FIG. 2, as described above.

A draw side 36 of at least one forward osmosis desalination unit 34 receives the reject stream R output from the reverse osmosis desalination unit 26 and outputs a concentrated saline solution C. In FIG. 1, a single forward osmosis desalination unit 34 is shown. However, as will be described in greater detail below, a plurality of forward osmosis desalination units may be connected in series to one another. It should be understood that each forward osmosis desalination unit may be any suitable type of forward osmosis desalination system using any suitable type of FO membrane 40, such as forward osmosis unit 200 of FIG. 3, as described above.

A feed side 38 of the at least one forward osmosis desalination unit 34 receives a second portion of the permeate stream $P_2$ output from the permeate side 18 of the nanofiltration unit 14 and outputs a dilute saline stream D. The dilute saline stream D is recirculated to mix with the first portion of the permeate stream $P_1$ output from the permeate side 18 of nanofiltration unit 14, prior to the receipt thereof by the feed side 30 of the reverse osmosis desalination unit 26.

The fluid pressure within the draw side 36 of the at least one forward osmosis desalination unit 34 is greater than the fluid pressure within the feed side 38 of the at least one forward osmosis desalination unit 34. Although, according to the basic operation principles of FO, water should be transported from feed side 38 to draw side 36, the water is actually transported from draw side 36 to feed side 38 due to a higher hydraulic pressure existing in draw side 36 (i.e., pressure-assisted FO). As described above, the at least one forward osmosis desalination unit may be a single forward osmosis desalination unit, such as that shown in FIG. 1, or, alternatively, may be a plurality of forward osmosis desalination units serially connected to one another, such as the dual-FO system shown in FIG. 4.

Figure 4:
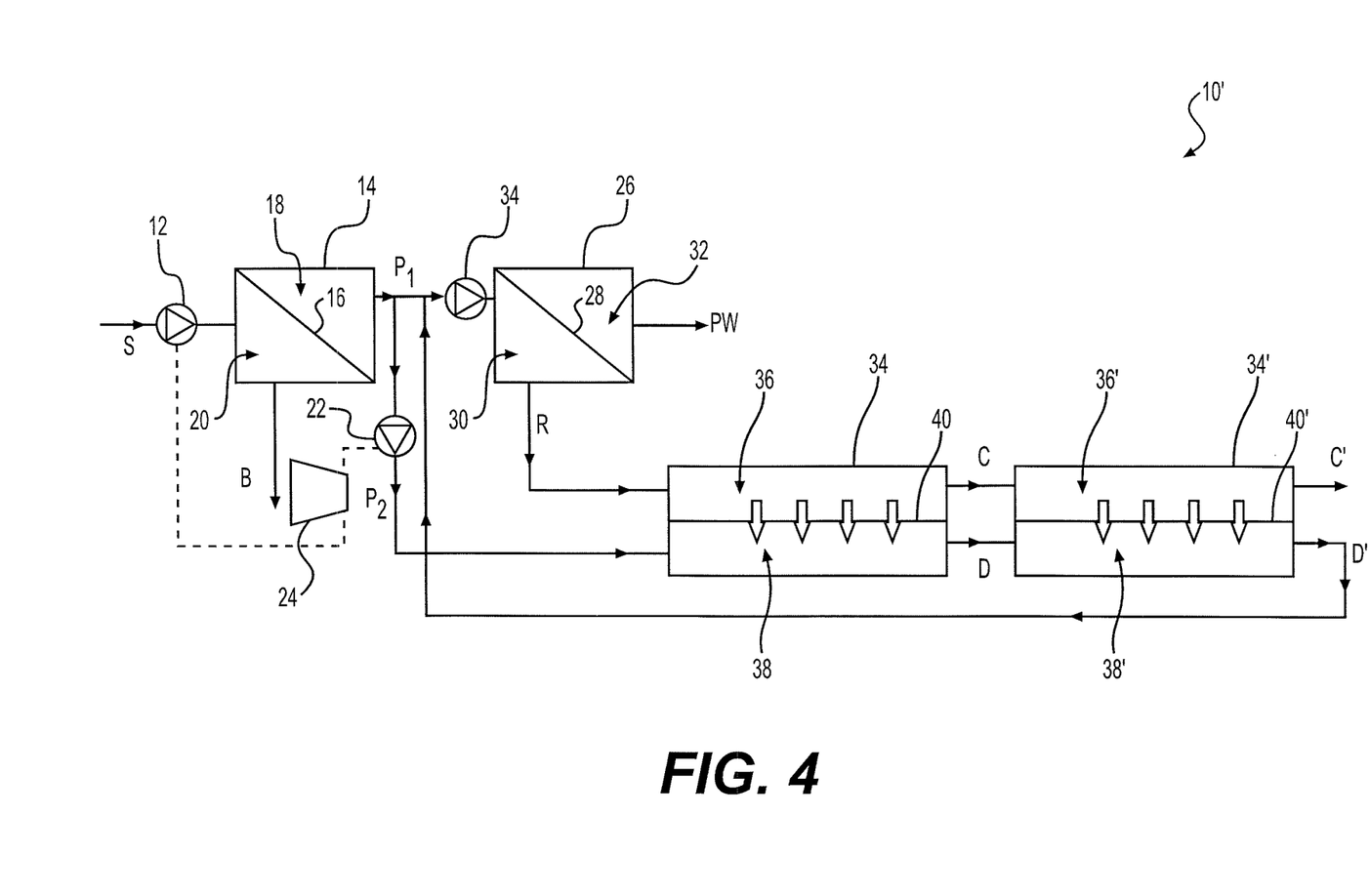
FIG. 4 is a schematic diagram of an alternative embodiment of the high water recovery hybrid membrane system for desalination and brine concentration.

The high water recovery hybrid membrane system for desalination and brine concentration of FIG. 4 is similar to that of FIG. 1, but with an additional forward osmosis desalination unit 34' connected in series to forward osmosis desalination unit 34. The concentrated saline solution C output from the draw side 36 of forward osmosis desalination unit 34 is received by the draw side 36' of additional forward osmosis desalination unit 34'. The additional forward osmosis desalination unit 34' may be any suitable type of forward osmosis desalination system using any suitable type of FO membrane 40', such as forward osmosis unit 200 of FIG. 3, as described above. The draw side 36' of the additional forward osmosis desalination unit 34' outputs a highly concentrated brine solution C'. The dilute saline stream D output from the feed side 38 of forward osmosis desalination system 34 is received by the feed side 38' of the additional forward osmosis desalination system 34', which outputs a diluted water stream D', which recirculates back to be mixed with the first portion of the permeate stream $P_1$ output from the permeate side 18 of nanofiltration unit 14, prior to the receipt thereof by the feed side 30 of the reverse osmosis desalination unit 26, as in the previous embodiment.

It should be understood that although FIG. 4 shows two forward osmosis desalination units 34, 34' connected in series, any number of forward osmosis desalination units may be connected in the same manner. In experiments, a dual-FO system, such as that shown in FIG. 4, achieved a final FO brine total dissolved solids (TDS) of 128,493 ppm. The overall water recovery of this system was 60%. A comparison between the single-FO system of FIG. 1 and the dual-FO system of FIG. 4 is given in Table 2 below. A system with three forward osmosis desalination units achieved a final FO brine TDS of 154,191 ppm. The overall water recovery of this system was 70%.

In Table 1, below, the labels of each fluid correspond to those of FIGS. 1 and 4, i.e., Table 1 provides results for the initial pretreated seawater stream S input into nanofiltration unit 14, the brine B output from nanofiltration unit 14, the pure water PW output from reverse osmosis desalination unit 26, and the reject output R from reverse osmosis desalination unit 26. Additional columns are provided for the permeate output by the NF unit 14 (prior to division into separate permeate streams $P_1$ and $P_2$), and the feed injected into the feed side 30 of the reverse osmosis desalination unit 26 (consisting of stream $P_1$ and either dilute solution D of FIG. 1 or dilute solution D' of FIG. 4). For each stream, Table 1 provides the total concentration of dissolved solids (primarily salt), the operating pressure of each stream in the process, and the overall water recovery (given as a percentage). Table 2 also provides the total concentration of dissolved solids (primarily salt), the operating pressure of each stream in the process, and the overall water recovery (given as a percentage), with specific comparisons being made between the concentrated outputs C, C' between the systems of FIGS. 1 and 4, respectively, and the dilute outputs D, D' between the systems of FIGS. 1 and 4, respectively.

TABLE 1

Results for system of FIG. 1
Concentration, Pressure and Water Recovery for each Process Stream

|  | S | B | NF Permeate | RO Feed | PW | R |
|---|---|---|---|---|---|---|
| Concentration (ppm) | 35,380 | 44,200 | 26,280 | 23,652 | <280 | 65,700 |
| Pressure (bar) | 30 (at pump 12) | — | 4 (at pump 22) | 70 (at pump 34) | 0.69 | 5.52 |
| Water recovery (%) | 25.72 | — | — | — | 64.00 | 60.00 |

TABLE 2

Results for systems of FIGS. 1 and 4
Concentration, Pressure and Water
Recovery for each Process Stream

|  | C | D | C' | D' |
|---|---|---|---|---|
| Concentration (ppm) | 95,189 | 16,800 | 128,493 | 10,517 |
| Pressure (bar) | 5.52 | 5.52 | 70.34 | 0.0 |
| Water recovery (%) | 45.00 | — | 34.99 | — |

Figure 5:
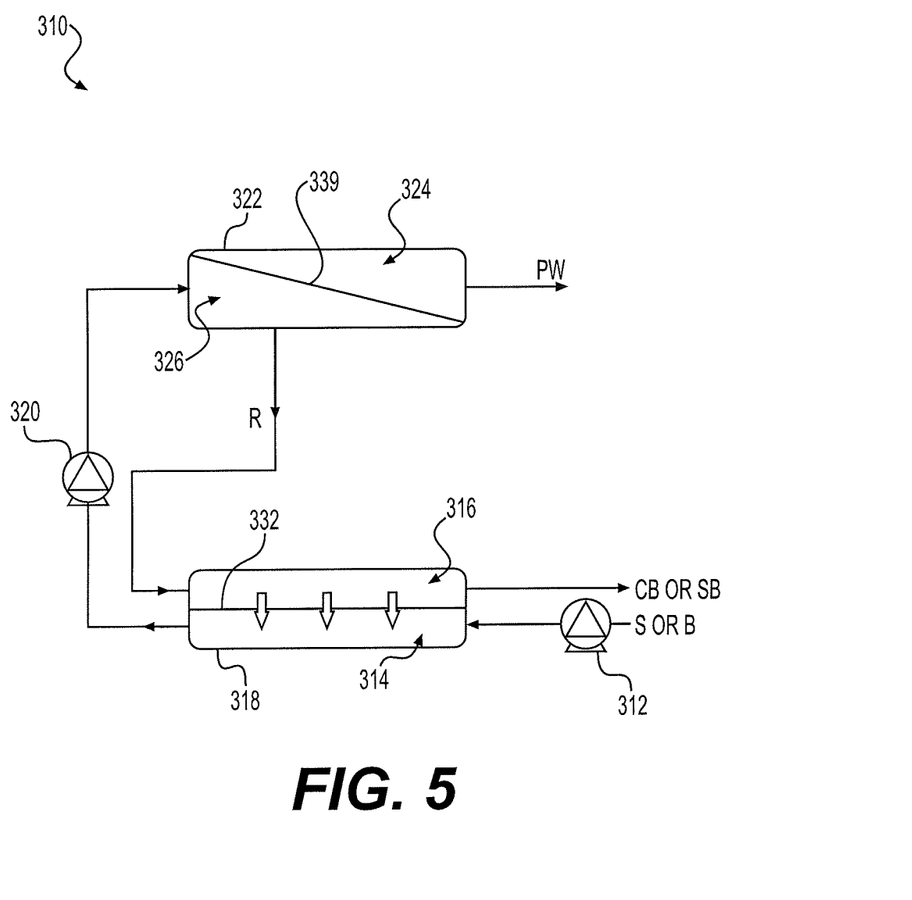
FIG. 5 is a schematic diagram of another alternative embodiment of the high water recovery hybrid membrane system for desalination and brine concentration.

In the alternative embodiment of FIG. 5, the nanofiltration unit is removed from high water recovery hybrid membrane system for desalination and brine concentration 310 to desalinate the seawater S or brine B using only a reverse osmosis desalination unit 322 and a forward osmosis desalination unit 318. In this embodiment, the feed side 326 of the reverse osmosis desalination unit 322 is in fluid communication with the feed side 314 of the forward osmosis desalination unit, such that seawater S or brine B drawn through the feed side 314 of the forward osmosis desalination unit 318 is fed into the feed side 326 of the reverse osmosis desalination unit 322. A delivery pump 312 may inject the seawater S or brine B, under pressure, through the feed side 314 of the forward osmosis desalination unit 318. A circulation pump 320 delivers the seawater S or brine B from the feed side 314 of the forward osmosis desalination unit 318 to the feed side 326 of the reverse osmosis desalination unit 322. The circulation pump 320 is a high pressure pump, such that the seawater S or brine B injected into the feed side 326 of the reverse osmosis desalination unit 322 is injected at a pressure greater than 60 bar.

It should be understood that reverse osmosis desalination unit 322 may be any suitable type of reverse osmosis desalination system using any suitable type of RO membrane 339, such as reverse osmosis unit 100 of FIG. 2, as described above. Similarly, it should be understood that the forward osmosis desalination unit 318 may be any suitable type of forward osmosis desalination system using any suitable type of FO membrane 332, such as forward osmosis unit 200 of FIG. 3, as described above.

The reverse osmosis desalination unit 322 performs reverse osmosis desalination on the seawater S or brine B fed into the feed side 326, outputting pure water PW extracted from the seawater S or brine B from the permeate side 324. The feed side 326 of the reverse osmosis desalination unit 322 outputs a reject stream R. The draw side 316 of the forward osmosis desalination unit 318 is in fluid communication with the feed side 326 of the reverse osmosis desalination unit 322, such that the draw side 316 of the forward osmosis desalination unit 318 receives the reject stream R and outputs concentrated brine CB or highly saturated brine SB.

The delivery pump 312 may be a low pressure pump, operating at about 1 to 2 bar. In experiments, using the above pressure values, no product water PW was observed for the initial two minutes of operation. The concentrated brine CB typically enters the draw side 316 of the forward osmosis desalination unit 318 at a hydraulic pressure of about 58 bar. Subsequently, water transport occurs from the draw side 316 to the feed side 314, across the FO membrane 332, due to the combined effect of hydraulic and osmotic pressures faced by the fluid in the draw side 316. As in the previous embodiment, pressure-assisted FO is taking place, such that pure water transports from the high osmotic pressure brine side 316 to the low osmotic pressure seawater side 314. This results in further dilution of the seawater or brine intake stream in the feed side 314 and a further concentration of the brine B.

In experiments, system 310 attained a state of equilibrium after 2-4 minutes of operation, during which the TDS of the feed stream into the feed side 326 of the RO unit 322 dropped. Due to the reduction in the salinity of the RO feed seawater, the recovery of the RO unit 322 was drastically increased to ~60% at an operating pressure of 60 bar to produce fresh water with a TDS of ~135 ppm in the permeate side 324. Corresponding to the above experimental values, the initial seawater stream S had a TDS of 42,121 ppm with a flow rate of 600 lph, and a conductivity of 65,815 µS/cm. Pure water PW was output at a flow rate of 360 lph, with a conductivity of 192 µS/cm. For purposes of comparison, under similar conditions, a single RO unit would have a water recovery of 30.0%, whereas system 310 has a water recovery of 60.0%. Table 3 below compares the composition of seawater S and the pure water PW output by system 310.

TABLE 3

Comparison between Seawater Feed and Pure Water Output

| Parameter (unit) | Seawater feed | Pure Water product |
|---|---|---|
| pH | 7.4 | 7.2 |
| Conductivity (mS/cm) | 55.4 | 0.29 |
| TDS (ppm) | 35801 | 135 |
| Calcium (mg/L) | 824 | 6.16 |
| Magnesium (mg/L) | 1154 | 5.83 |
| Sulfate (mg/L) | 3600 | 0 |

TABLE 3-continued

Comparison between Seawater Feed and Pure Water Output

| Parameter (unit) | Seawater feed | Pure Water product |
|---|---|---|
| Chloride (mg/L) | 26000 | 38 |
| Sodium (mg/L) | 14,800 | 65 |
| Alkalinity (mg/L) | 120 | 4.3 |
| Boron (mg/L) | 2.75 | 0.24 |
| Nitrate (mg/L) | 3.5 | 0.7 |
| Copper (mg/L) | <0.05 | <0.05 |
| Chromium (mg/L) | <0.05 | <0.05 |
| Iron (mg/L) | <0.05 | <0.05 |
| Silica (mg/L) | 16.2 | 0.724 |
| Phosphate (mg/L) | 0.15 | 0.11 |
| Fluoride (mg/L) | 4.3 | 0.13 |

As noted above, the seawater S may be pretreated, such as by passage through a coarse screen, use of a beach well or media filter, flocculation and clarification, ultrafiltration, dual media, and/or any other suitable pretreatment process (es) to remove suspended solids, such as silt particles, silica or organic matter. Further, as noted above, NF unit 14 rejects the divalent "hardness" ions from the seawater S, such as magnesium, calcium and bicarbonate ions, thus reducing scaling and fouling of the RO and FO membranes 28, 40. This treatment is also effective at reducing the salinity of the feed solution, thus reducing the pressure requirements in the subsequent FO and RO processes. The NF membrane 16 may be any suitable type of NF membrane, such as a spiral-wound membrane, a plate-and-frame membrane, hollow fiber modules, or a plurality of stacked or layered sheets or nanofillers incorporated into membranes or nanofibers. For example, NF membrane 16 may be formed from cellulose ester derivatives or other polyamide-type thin film composite membranes or nanocomposite membranes. The molecular weight cut-off of the NF membrane 16 may be in the range of 200-500 Da, with a typical operating pressure of about 70-400 psi, with a maximum operating pressure of about 600 psi. The maximum pressure drop of the NF unit 14 may be 12 psi over an element and 50 psi per housing. The typical operating flux of NF unit 14 is about 13-34 L/m$^2$ h.

The RO membrane 28 (or membrane 339) may be a semipermeable membrane with any suitable geometric configuration, such as a spiral-wound membrane, a plate-and-frame, hollow fiber modules, or a plurality of stacked or layered sheets or nanofillers incorporated into membranes or nanofibers. For example, RO membrane 28 may be formed from cellulose ester derivatives or other polyamide-type thin film composite membranes or nanocomposite membranes. An RO membrane with a high salt rejection efficiency of >99% with a high operating pressure range of 60-80 bar would be suitable.

The FO membranes 40, 40' (or membrane 332) may be, for example, semipermeable membranes with suitable geometric configurations, such as spiral-wound membranes, plate-and-frame membranes, hollow fiber modules, or a plurality of stacked or layered sheets or nanofillers incorporated into membranes or nanofibers. The thickness of the FO membrane 40, 40' is typically far less than that of RO membrane 28 due to the non-pressure requirement of the FO process. An operating pressure up to 70 bar and a salt rejection of >99% would be suitable. The FO membrane 40, 40' is configured within the membrane module to attain high dispersion of dilute solution D, D' and feed solution throughout the module to attain a high permeate flow. Additionally, the membrane 40, 40' may be operated in any suitable configuration, such as cross flow, co-current, counter-current, axial or radial configurations.

It is to be understood that the high water recovery hybrid membrane desalination system for desalination and brine concentration is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A water recovery hybrid membrane system for desalination and brine concentration, consisting of:
    a nanofiltration unit including a nanofiltration chamber having a semipermeable membrane with a pore size between 1 nm and 10 nm, the membrane defining a permeate side and a feed side of the nanofiltration chamber, the feed side of the nanofiltration chamber being adapted for receiving a stream of seawater and outputting a reject brine stream, the permeate side of the nanofiltration chamber being adapted for outputting a permeate stream;
    a first pump for injecting the stream of seawater into the feed side of the nanofiltration chamber;
    a reverse osmosis desalination unit including a reverse osmosis desalination chamber having a semipermeable membrane having a pore size up to 1 nm, the membrane defining a feed side and a permeate side of the reverse osmosis desalination chamber, the feed side of the reverse osmosis desalination chamber being adapted for receiving a first portion of the permeate stream output from the permeate side of the nanofiltration chamber and outputting a reject stream, the permeate side of the reverse osmosis desalination chamber outputting pure water, the reverse osmosis desalination unit being connected in series to the nanofiltration unit;
    a second pump for injecting the first portion of the permeate stream output from the permeate side of the nanofiltration chamber;
    at least one forward osmosis desalination unit including a forward osmosis desalination chamber having a semipermeable membrane defining a feed side and a draw side of the at least one forward osmosis desalination chamber, the draw side of the at least one forward osmosis desalination chamber being adapted for receiving the reject stream output from the reverse osmosis desalination chamber and outputting a concentrated saline solution, the feed side of the at least one forward osmosis desalination chamber being adapted for receiving a second portion of the permeate stream output from the permeate side of the nanofiltration chamber and outputting a dilute saline stream, wherein the dilute saline stream is injected into the feed side of the reverse osmosis desalination chamber with the second pump, the at least one forward osmosis desalination unit being connected in series to the reverse osmosis desalination unit;
    a third pump for injecting the second portion of the permeate stream output from the permeate side of the nanofiltration chamber into the feed side of the at least one forward osmosis desalination unit; and
    a pressure exchanger in fluid communication with the first and third pumps.

2. The water recovery hybrid membrane system as recited in claim 1, wherein the at least one forward osmosis desalination unit consists of a plurality of forward osmosis desalination units connected in series to one another.

* * * * *